(12) United States Patent
Mayers et al.

(10) Patent No.: US 11,991,400 B2
(45) Date of Patent: May 21, 2024

(54) DEVICE FOR EXECUTING AUDIO CRYPTOLOGY IN REAL-TIME FOR AUDIO MISAPPROPRIATION PREVENTION

(71) Applicant: BANK OF AMERICA CORPORATION, Charlotte, NC (US)

(72) Inventors: Kyle Mayers, Charlotte, NC (US); George Anthony Albero, Charlotte, NC (US); Michael Robert Young, Davidson, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 161 days.

(21) Appl. No.: 17/866,109

(22) Filed: Jul. 15, 2022

(65) Prior Publication Data

US 2024/0022770 A1    Jan. 18, 2024

(51) Int. Cl.
*H04N 21/23*   (2011.01)
*H04N 21/233*  (2011.01)
*H04N 21/266*  (2011.01)

(52) U.S. Cl.
CPC ......... *H04N 21/233* (2013.01); *H04N 21/266* (2013.01)

(58) Field of Classification Search
None
See application file for complete search history.

(56) References Cited

U.S. PATENT DOCUMENTS

| | | |
|---|---|---|
| 4,200,770 A | 4/1980 | Diffie et al. |
| 4,933,971 A | 6/1990 | Bestock et al. |
| 5,200,999 A | 4/1993 | Matyas et al. |
| 5,241,599 A | 8/1993 | Bellovin et al. |
| 5,347,580 A | 9/1994 | Molva et al. |
| 5,659,616 A | 8/1997 | Sudia |
| 5,937,066 A | 8/1999 | Gennaro et al. |
| 6,035,041 A | 3/2000 | Frankel et al. |
| 6,052,469 A | 4/2000 | Johnson et al. |
| 6,848,050 B1 | 1/2005 | Merman et al. |
| 6,901,145 B1 | 5/2005 | Bohannon et al. |
| 6,970,849 B1 | 11/2005 | Demello et al. |
| 6,971,022 B1 | 11/2005 | Katta et al. |
| 7,266,699 B2 | 9/2007 | Newman et al. |
| 2006/0277406 A1 | 12/2006 | Hashimoto et al. |
| 2007/0014407 A1 | 1/2007 | Narendra et al. |
| 2007/0014408 A1* | 1/2007 | Narendra ............. H04L 9/0866 380/270 |
| 2007/0016798 A1 | 1/2007 | Narendra et al. |

(Continued)

*Primary Examiner* — Cai Y Chen
(74) *Attorney, Agent, or Firm* — Moore & Van Allen PLLC; Nicholas C. Russell

(57) ABSTRACT

Embodiments of the present invention provide a system for executing audio cryptology in real-time for audio misappropriation prevention. The system is configured for identifying, via a cryptographic device, one or more audio signals, causing the cryptographic device to generate and emit a dynamically varying continuous audio tone, continuously monitoring in real-time the one or more audio signals, via the cryptographic device, determining, via the cryptographic device, termination of the one or more audio signals based on continuously monitoring the one or more audio signals in real-time, and causing the cryptographic device to stop generating and emitting the dynamically varying continuous audio tone.

20 Claims, 7 Drawing Sheets

(56) References Cited

U.S. PATENT DOCUMENTS

2008/0103982 A1* 5/2008 Hammad ............. G06Q 20/085
705/66
2008/0263363 A1 10/2008 Jueneman et al.

* cited by examiner

DEVICE FOR EXECUTING AUDIO CRYPTOLOGY IN REAL-TIME FOR AUDIO MISAPPROPRIATION PREVENTION

BACKGROUND

There exists a need for a system that prevents misappropriation of audio signals.

BRIEF SUMMARY

The following presents a summary of certain embodiments of the invention. This summary is not intended to identify key or critical elements of all embodiments nor delineate the scope of any or all embodiments. Its sole purpose is to present certain concepts and elements of one or more embodiments in a summary form as a prelude to the more detailed description that follows.

Embodiments of the present invention address the above needs and/or achieve other advantages by providing apparatuses (e.g., a system, computer program product and/or other devices) and methods for executing audio cryptology in real-time for audio misappropriation prevention. The system embodiments may comprise one or more memory devices having computer readable program code stored thereon, a communication device, and one or more processing devices operatively coupled to the one or more memory devices, wherein the one or more processing devices are configured to execute the computer readable program code to carry out the invention. In computer program product embodiments of the invention, the computer program product comprises at least one non-transitory computer readable medium comprising computer readable instructions for carrying out the invention. Computer implemented method embodiments of the invention may comprise providing a computing system comprising a computer processing device and a non-transitory computer readable medium, where the computer readable medium comprises configured computer program instruction code, such that when said instruction code is operated by said computer processing device, said computer processing device performs certain operations to carry out the invention.

In some embodiments, the present invention identifies, via a cryptographic device, one or more audio signals, in response to determining the one or more audio signals, causes the cryptographic device to generate and emit a dynamically varying continuous audio tone, continuously monitors in real-time the one or more audio signals, via the cryptographic device, determines, via the cryptographic device, termination of the one or more audio signals based on continuously monitoring the one or more audio signals in real-time, and causes the cryptographic device to stop generating and emitting the dynamically varying continuous audio tone.

In some embodiments, the present invention causes the cryptographic device to record the one or more audio signals.

In some embodiments, the present invention causes the cryptographic device to emit the dynamically varying continuous audio tone based on selecting a frequency for generating the dynamically varying continuous audio tone and storing the frequency and a time stamp associated with generation of the dynamically varying continuous audio tone by the cryptographic device using the frequency.

In some embodiments, the present invention determines that the time stamp meets a predefined limit, selects a new frequency for generating the dynamically varying continuous audio tone, and causes the cryptographic device to generate and emit the dynamically varying continuous audio tone using the new frequency.

In some embodiments, the present invention stores the new frequency and a new time stamp associated with generation of the dynamically varying continuous audio tone by the cryptographic device using the new frequency.

In some embodiments, the dynamically varying continuous audio tone is a tone that is inaudible to one or more users and audible to one or more recording devices.

In some embodiments, the dynamically varying continuous audio tone mixes with the one or more audio signals and causes recording of the one or more audio signals to have varying characteristics.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
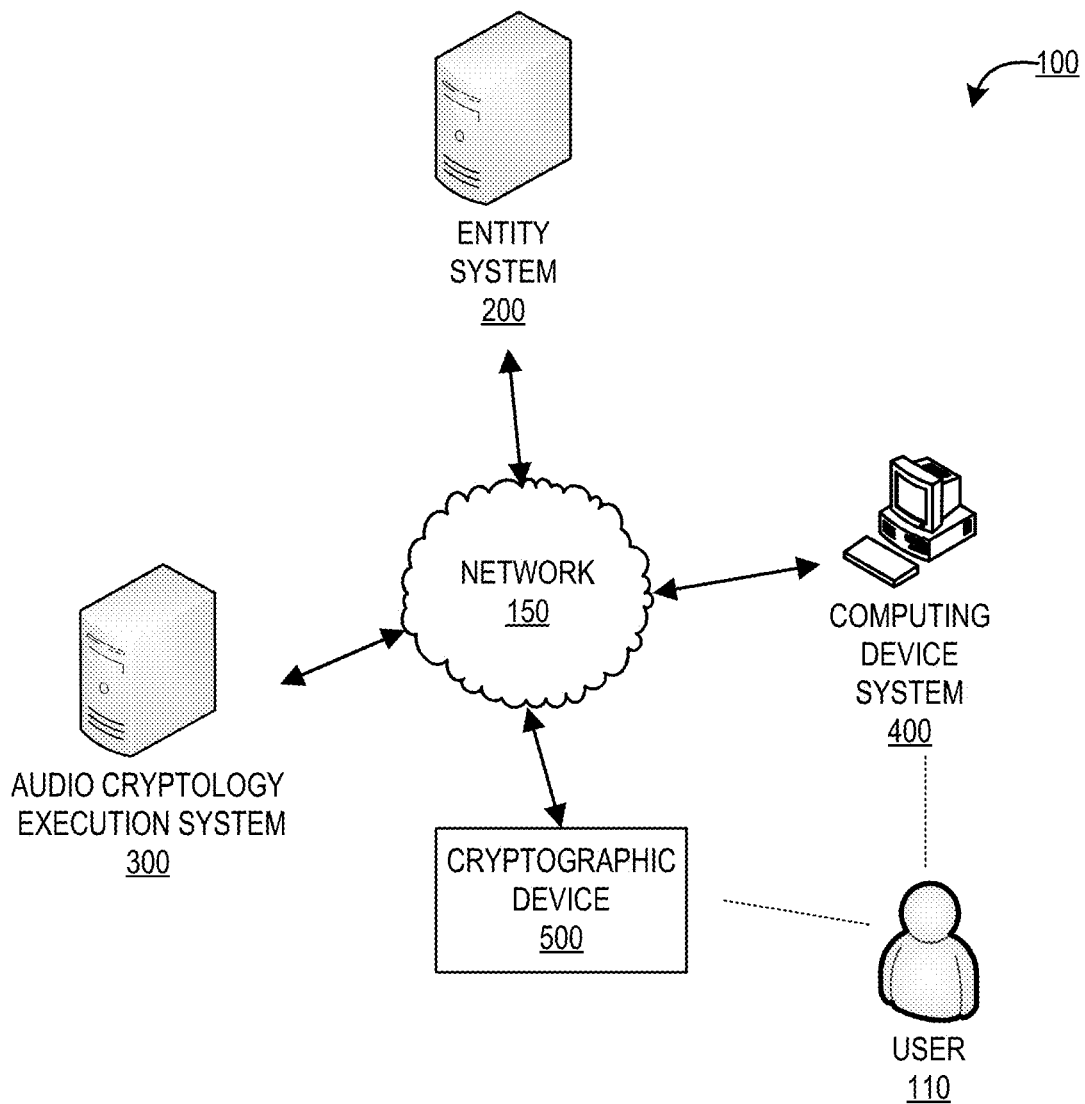
Figure 2:
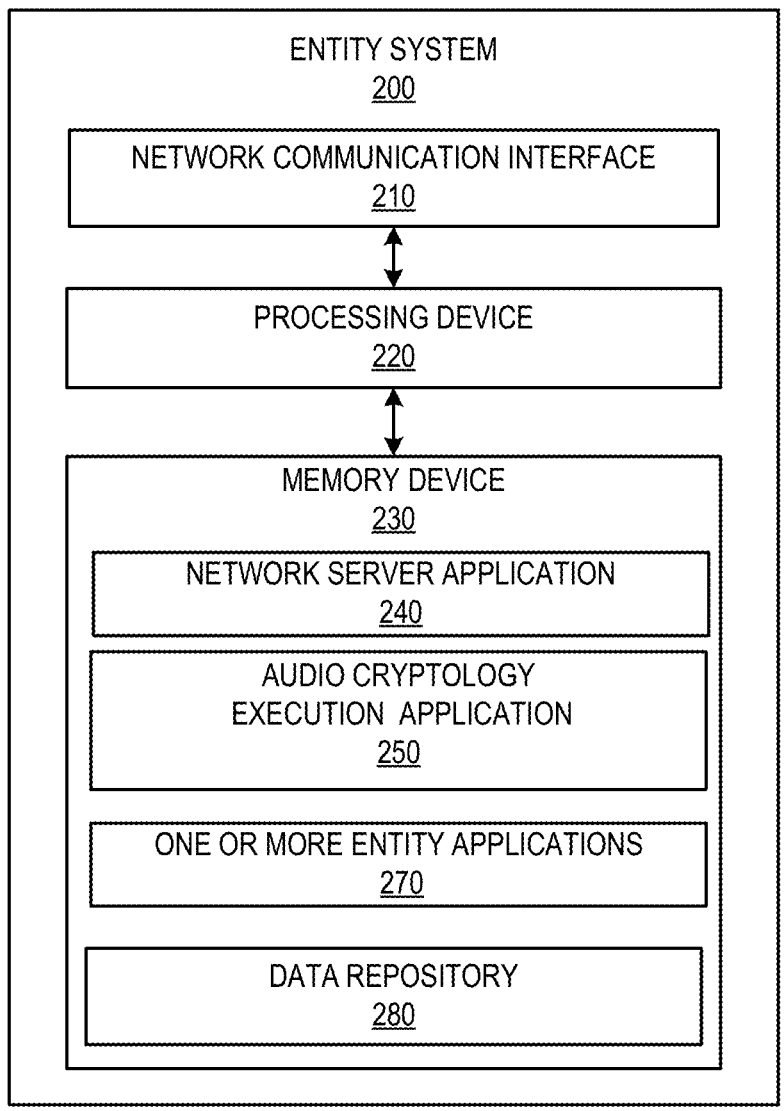
Figure 3:
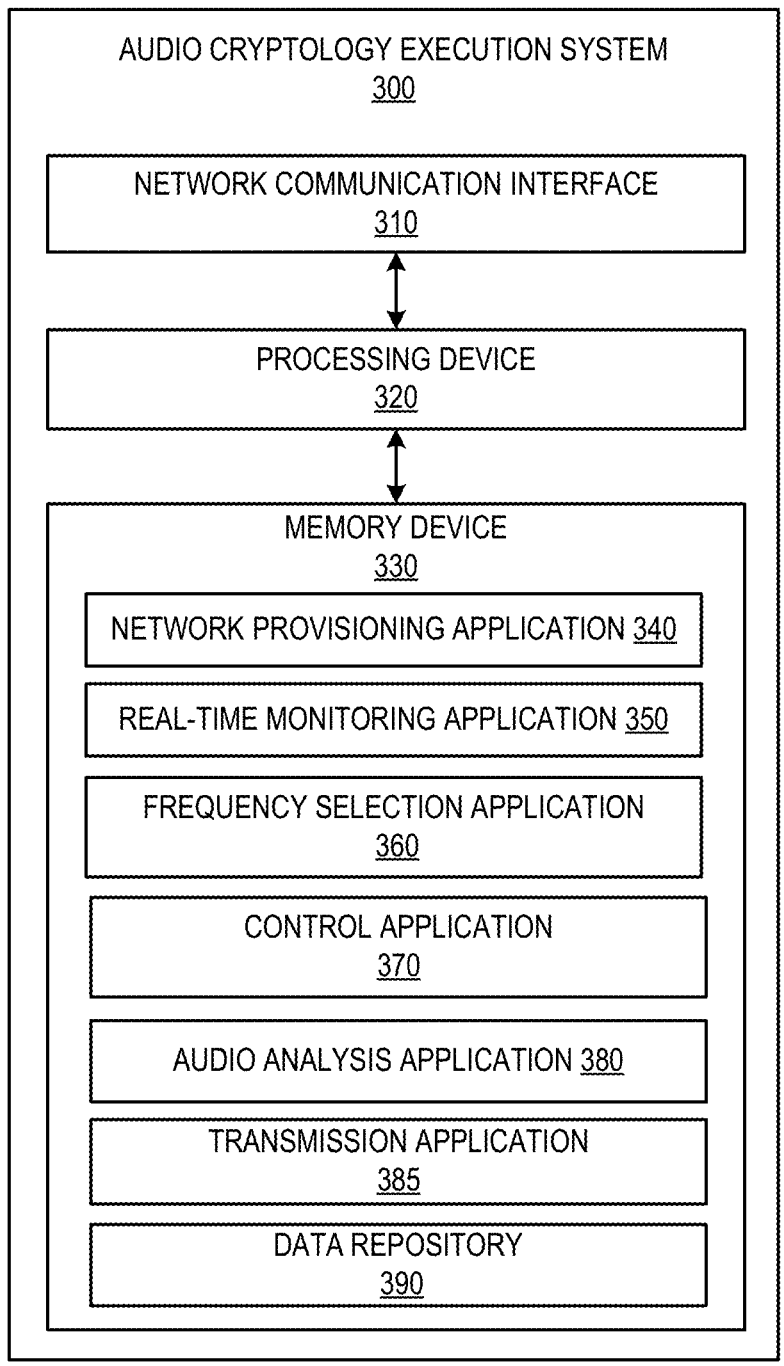
Figure 4:
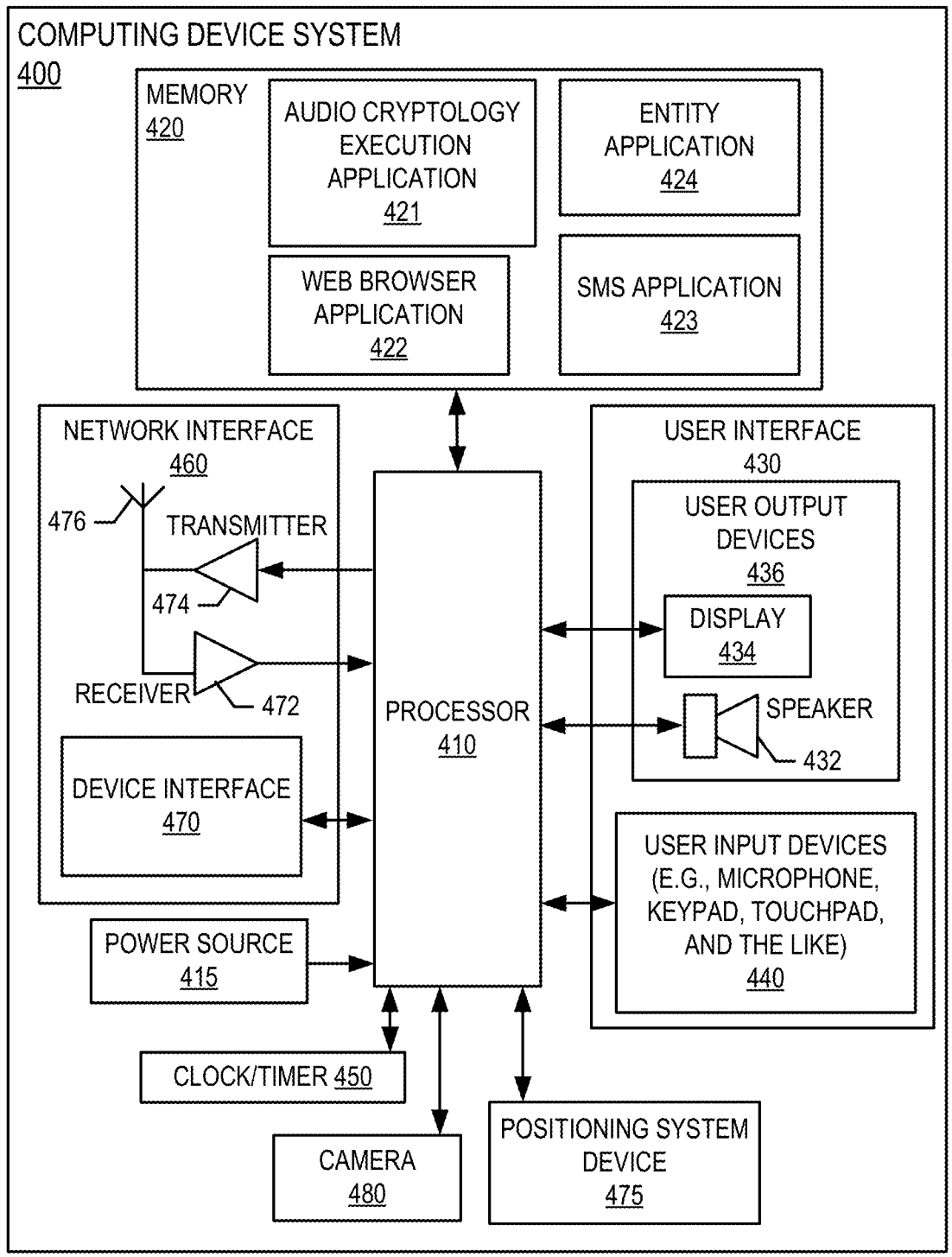
Figure 5:
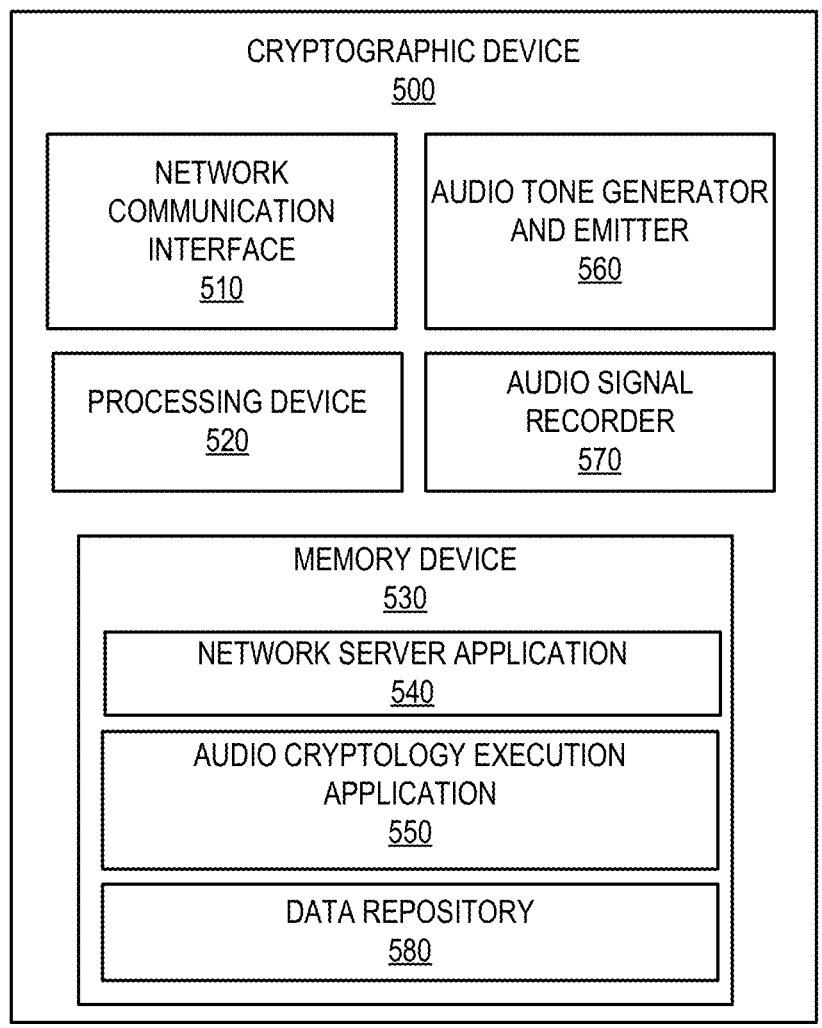
Figure 6:
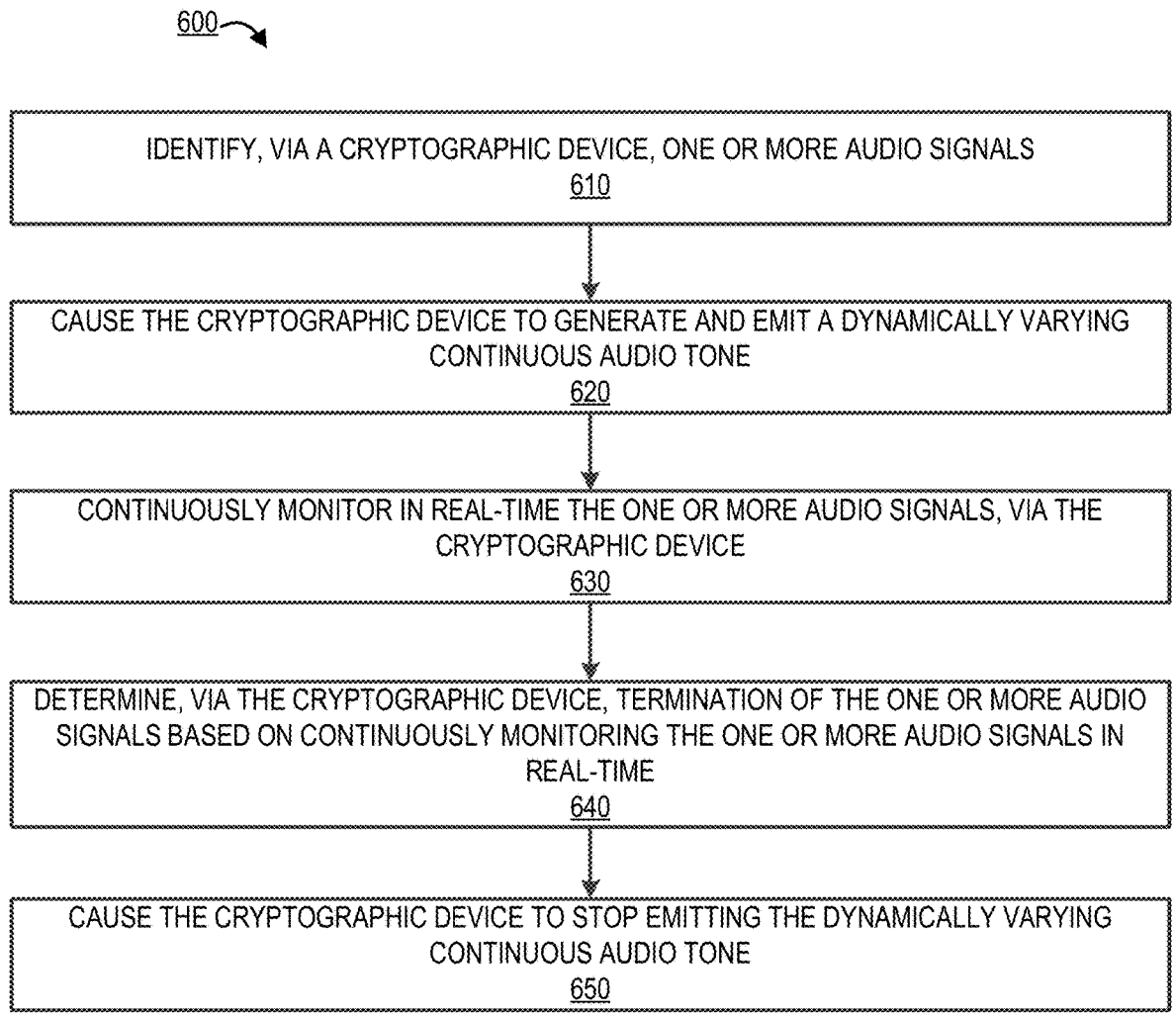
Figure 7:
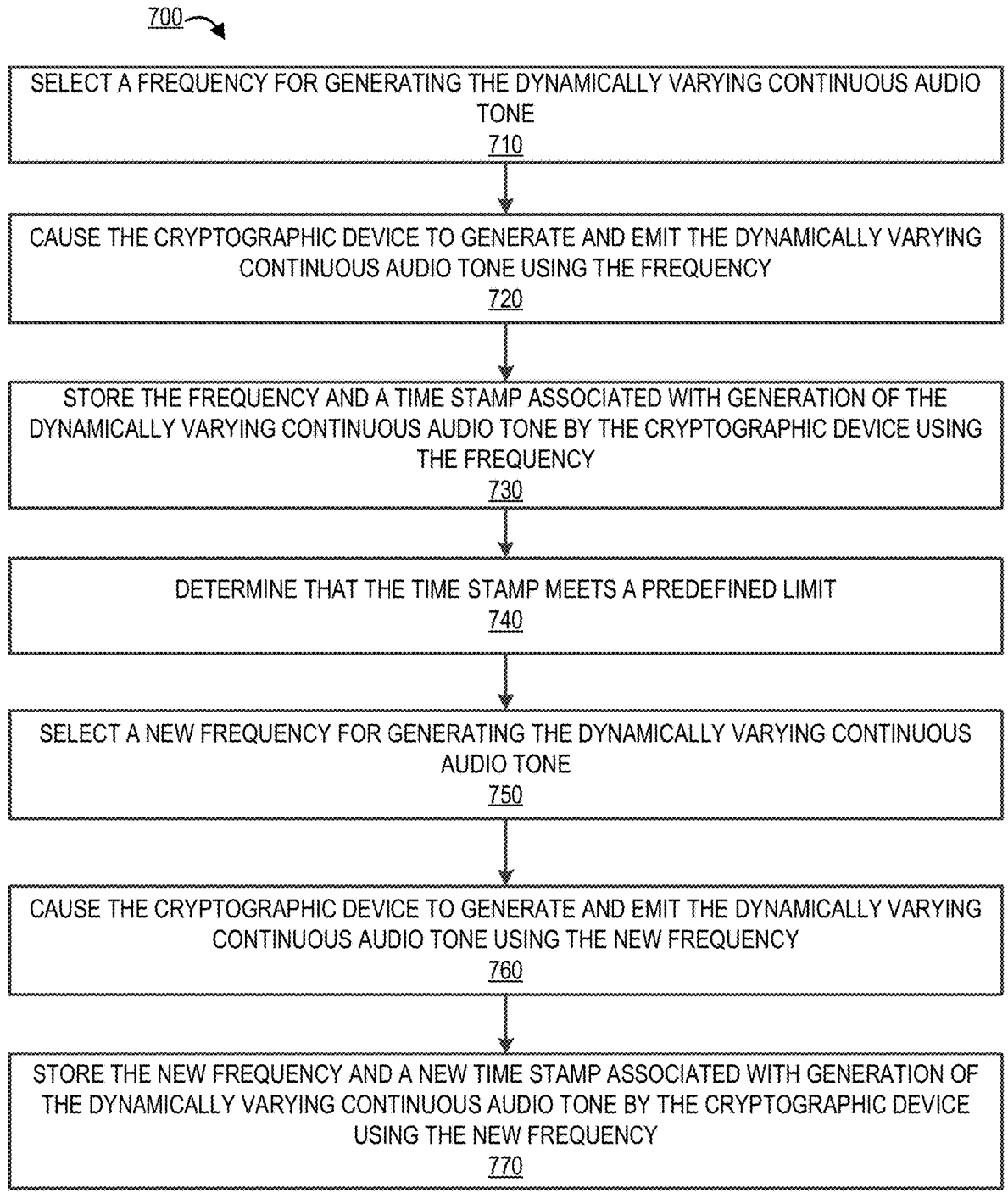

Having thus described embodiments of the invention in general terms, reference will now be made the accompanying drawings, wherein:

FIG. 1 provides a block diagram illustrating a system environment for executing audio cryptology in real-time for audio misappropriation prevention, in accordance with an embodiment of the invention;

FIG. 2 provides a block diagram illustrating an entity system 200 of FIG. 1, in accordance with an embodiment of the invention;

FIG. 3 provides a block diagram illustrating an audio cryptology execution system 300 of FIG. 1, in accordance with an embodiment of the invention;

FIG. 4 provides a block diagram illustrating a computing device system 400 of FIG. 1, in accordance with an embodiment of the invention;

FIG. 5 provides a provides a block diagram illustrating a cryptographic device 500 of FIG. 1, in accordance with an embodiment of the invention;

FIG. 6 provides a process flow for executing audio cryptology in real-time for audio misappropriation prevention, in accordance with an embodiment of the invention; and FIG. 7 provides a process flow for causing the cryptographic device 500 to generate and emit a dynamically varying continuous audio tone, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As described herein, the term "entity" may be a financial institution which may include herein may include any financial institutions such as commercial banks, thrifts, federal and state savings banks, savings and loan associations, credit unions, investment companies, insurance companies and the like. In some embodiments, the entity may be a non-financial institution.

Many of the example embodiments and implementations described herein contemplate interactions engaged in by a user with a computing device and/or one or more communication devices and/or secondary communication devices. A "user", as referenced herein, may refer to a customer of the entity, where if the entity is a financial institution, the entity maintains and/or manages one or more accounts (e.g., credit account, checking account, savings account, or the like) associated with the user. In some embodiments, the term "user" may refer to a potential customer of the entity. Furthermore, as used herein, the term "user computing device" or "mobile device" may refer to mobile phones, computing devices, tablet computers, wearable devices, smart devices and/or any portable electronic device capable of receiving and/or storing data therein.

A "user interface" is any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user or to output data to a user. These input and output devices may include a display, mouse, keyboard, button, touchpad, touch screen, microphone, speaker, LED, light, joystick, switch, buzzer, bell, and/or other user input/output device for communicating with one or more users.

Typically audio signals are often recorded by unauthorized users and are misappropriated. Audio signals may include, but are not limited to, audio passwords, speeches, audio personal data, and/or the like. As such, there exists a need for system that prevents misappropriation of audio signals. The system of the invention solves this problem as discussed in detail below.

FIG. 1 provides a block diagram illustrating a system environment 100 for executing audio cryptology in real-time for audio misappropriation prevention, in accordance with an embodiment of the invention. As illustrated in FIG. 1, the environment 100 includes an audio cryptology execution system 300, an entity system 200, a computing device system 400, and a cryptographic device 500. One or more users 110 may be included in the system environment 100, where the users 110 interact with the other entities of the system environment 100 via a user interface of the computing device system 400. In some embodiments, the one or more user(s) 110 of the system environment 100 may be customers of an entity associated with the entity system 200. In some embodiments, the one or more users 110 may be potential customers of the entity associated with the entity system 200.

The entity system(s) 200 may be any system owned or otherwise controlled by an entity to support or perform one or more process steps described herein. In some embodiments, the entity is a financial institution. In some embodiments, the entity may be a non-financial institution.

The audio cryptology execution system 300 is a system of the present invention for performing one or more process steps described herein. In some embodiments, the audio cryptology execution system 300 may be an independent system. In some embodiments, the audio cryptology execution system 300 may be a part of the entity system 200. In some embodiments, the audio cryptology execution system 300 may be controlled, owned, managed, and/or maintained by the entity associated with the entity system 200.

The audio cryptology execution system 300, the entity system 200, the computing device system 400, and the cryptographic device 500 may be in network communication across the system environment 100 through the network 150. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet. In general, the audio cryptology execution system 300 is configured to communicate information or instructions with the cryptographic device 500, the entity system 200, and/or the computing device system 400 across the network 150.

The cryptographic device 500 may be any device that is configured to implement one or more steps of the process flow described herein. In some embodiments, the audio cryptology execution system 300 may be embedded within the cryptographic device 500 that is configured to control the cryptographic device 500. In some embodiments, one or more components of the cryptographic device 500 may receive, transmit, and/or execute instructions received from the audio cryptology execution system 300. In some embodiments, the audio cryptology execution system 300 may be a remote system that is configured to control the cryptographic device 500 remotely. In some embodiments, the cryptographic device 500 may be any device that is wearable by the users 110. Examples of the cryptographic device 500 may include, but are not limited to lapel pins, watches, wrist band, cuff links, jewelry (e.g., rings, earrings, pendant, or the like), hair accessories, and/or the like.

The computing device system 400 may be a system owned or controlled by the entity of the entity system 200 and/or the user 110. As such, the computing device system 400 may be a computing device of the user 110. In general, the computing device system 400 communicates with the user 110 via a user interface of the computing device system 400, and in turn is configured to communicate information or instructions with the audio cryptology execution system 300, and/or entity system 200 across the network 150.

FIG. 2 provides a block diagram illustrating the entity system 200, in greater detail, in accordance with embodiments of the invention. As illustrated in FIG. 2, in one embodiment of the invention, the entity system 200 includes one or more processing devices 220 operatively coupled to a network communication interface 210 and a memory device 230. In certain embodiments, the entity system 200 is operated by a first entity, such as a financial institution or a non-financial institution.

It should be understood that the memory device 230 may include one or more databases or other data structures/repositories. The memory device 230 also includes computer-executable program code that instructs the processing device 220 to operate the network communication interface 210 to perform certain communication functions of the entity system 200 described herein. For example, in one embodiment of the entity system 200, the memory device 230 includes, but is not limited to, an audio cryptology execution application 250, one or more entity applications 270, and a data repository 280. The one or more entity applications 270 may be any applications developed, supported, maintained, utilized, and/or controlled by the entity. The computer-executable program code of the network server application 240, the audio cryptology execution application 250, the one or more entity application 270 to perform certain logic, data-extraction, and data-storing functions of the entity system 200 described herein, as well as communication functions of the entity system 200.

The network server application 240, the audio cryptology execution application 250, and the one or more entity applications 270 are configured to store data in the data repository 280 or to use the data stored in the data repository 280 when communicating through the network communication interface 210 with the audio cryptology execution system 300, and/or the computing device system 400 to perform one or more process steps described herein. In some embodiments, the entity system 200 may receive instructions from the audio cryptology execution system 300 via the audio cryptology execution application 250 to perform certain operations. The audio cryptology execution application 250 may be provided by the audio cryptology execution system 300. The one or more entity applications 270 may be any of the applications used, created, modified, facilitated, developed, and/or managed by the entity system 200.

FIG. 3 provides a block diagram illustrating the audio cryptology execution system 300 in greater detail, in accordance with embodiments of the invention. As illustrated in FIG. 3, in one embodiment of the invention, the audio cryptology execution system 300 includes one or more processing devices 320 operatively coupled to a network communication interface 310 and a memory device 330. In certain embodiments, the audio cryptology execution system 300 is operated by an entity, such as a financial institution. In other embodiments, the audio cryptology execution system 300 is operated by a non-financial institution. In some embodiments, the audio cryptology execution system 300 is owned or operated by the entity of the entity system 200. In some embodiments, the audio cryptology execution system 300 may be an independent system. In alternate embodiments, the audio cryptology execution system 300 may be a part of the entity system 200.

In some embodiments, the audio cryptology execution system 300 may be a system present within the cryptographic device 500. In such embodiments, the audio cryptology execution system 300 may control the cryptographic device 500 internally. In some other embodiments, the audio cryptology execution system 300 may be a remote system that controls the cryptographic device 500 remotely.

It should be understood that the memory device 330 may include one or more databases or other data structures/repositories. The memory device 330 also includes computer-executable program code that instructs the processing device 320 to operate the network communication interface 310 to perform certain communication functions of the audio cryptology execution system 300 described herein. For example, in one embodiment of the audio cryptology execution system 300, the memory device 330 includes, but is not limited to, a network provisioning application 340, a real-time monitoring application 350, a frequency selection application 360, a control application 370, an audio analysis application 380, a transmission application 385, and a data repository 390 comprising any data processed or accessed by one or more applications in the memory device 330. The computer-executable program code of the network provisioning application 340, the real-time monitoring application 350, the frequency selection application 360, the control application 370, the audio analysis application 380, and the transmission application 385 may instruct the processing device 320 to perform certain logic, data-processing, and data-storing functions of the audio cryptology execution system 300 described herein, as well as communication functions of the audio cryptology execution system 300.

The network provisioning application 340, the real-time monitoring application 350, the frequency selection application 360, the control application 370, the audio analysis application 380, and the transmission application 385 are configured to invoke or use the data in the data repository 390 when communicating through the network communication interface 310 with the cryptographic device 500, the entity system 200, and/or the computing device system 400. In some embodiments, the network provisioning application 340, the real-time monitoring application 350, the frequency selection application 360, the control application 370, the audio analysis application 380, and the transmission application 385 may store the data extracted or received from the cryptographic device 500, the entity system 200, and the computing device system 400 in the data repository 390. In some embodiments, the network provisioning application 340, the real-time monitoring application 350, the frequency selection application 360, the control application 370, the audio analysis application 380, and the transmission application 385 may be a part of a single application (e.g., modules).

FIG. 4 provides a block diagram illustrating a computing device system 400 of FIG. 1 in more detail, in accordance with embodiments of the invention. However, it should be understood that a mobile telephone is merely illustrative of one type of computing device system 400 that may benefit from, employ, or otherwise be involved with embodiments of the present invention and, therefore, should not be taken to limit the scope of embodiments of the present invention. Other types of computing devices may include portable digital assistants (PDAs), pagers, mobile televisions, desktop computers, workstations, laptop computers, cameras, video recorders, audio/video player, radio, GPS devices, wearable devices, Internet-of-things devices, augmented reality devices, virtual reality devices, automated teller machine devices, electronic kiosk devices, or any combination of the aforementioned.

Some embodiments of the computing device system 400 include a processor 410 communicably coupled to such devices as a memory 420, user output devices 436, user input devices 440, a network interface 460, a power source 415, a clock or other timer 450, a camera 480, and a positioning system device 475. The processor 410, and other processors described herein, generally include circuitry for implementing communication and/or logic functions of the computing device system 400. For example, the processor 410 may include a digital signal processor device, a microprocessor device, and various analog to digital converters, digital to analog converters, and/or other support circuits. Control and signal processing functions of the computing device system 400 are allocated between these devices according to their respective capabilities. The processor 410 thus may also include the functionality to encode and interleave messages and data prior to modulation and transmission. The processor 410 can additionally include an internal data modem. Further, the processor 410 may include functionality to operate one or more software programs, which may be stored in the memory 420. For example, the processor 410 may be capable of operating a connectivity program, such as a web browser application 422. The web browser application 422 may then allow the computing device system 400 to transmit and receive web content, such as, for example, location-based content and/or other web page content, according to a Wireless Application Protocol (WAP), Hypertext Transfer Protocol (HTTP), and/or the like.

The processor 410 is configured to use the network interface 460 to communicate with one or more other devices on the network 150. In this regard, the network interface 460 includes an antenna 476 operatively coupled to a transmitter 474 and a receiver 472 (together a "transceiver"). The processor 410 is configured to provide signals to and receive signals from the transmitter 474 and receiver 472, respectively. The signals may include signaling information in accordance with the air interface standard of the applicable cellular system of the wireless network 152. In this regard, the computing device system 400 may be configured to operate with one or more air interface standards, communication protocols, modulation types, and access types. By way of illustration, the computing device system 400 may be configured to operate in accordance with any of a number of first, second, third, and/or fourth-generation communication protocols and/or the like.

As described above, the computing device system 400 has a user interface that is, like other user interfaces described herein, made up of user output devices 436 and/or user input devices 440. The user output devices 436 include a display 430 (e.g., a liquid crystal display or the like) and a speaker 432 or other audio device, which are operatively coupled to the processor 410.

The user input devices 440, which allow the computing device system 400 to receive data from a user such as the user 110, may include any of a number of devices allowing the computing device system 400 to receive data from the user 110, such as a keypad, keyboard, touch-screen, touch-pad, microphone, mouse, joystick, other pointer device, button, soft key, and/or other input device(s). The user interface may also include a camera 480, such as a digital camera.

The computing device system 400 may also include a positioning system device 475 that is configured to be used by a positioning system to determine a location of the computing device system 400. For example, the positioning system device 475 may include a GPS transceiver. In some embodiments, the positioning system device 475 is at least partially made up of the antenna 476, transmitter 474, and receiver 472 described above. For example, in one embodiment, triangulation of cellular signals may be used to identify the approximate or exact geographical location of the computing device system 400. In other embodiments, the positioning system device 475 includes a proximity sensor or transmitter, such as an RFID tag, that can sense or be sensed by devices known to be located proximate a merchant or other location to determine that the computing device system 400 is located proximate these known devices.

The computing device system 400 further includes a power source 415, such as a battery, for powering various circuits and other devices that are used to operate the computing device system 400. Embodiments of the computing device system 400 may also include a clock or other timer 450 configured to determine and, in some cases, communicate actual or relative time to the processor 410 or one or more other devices.

The computing device system 400 also includes a memory 420 operatively coupled to the processor 410. As used herein, memory includes any computer readable medium (as defined herein below) configured to store data, code, or other information. The memory 420 may include volatile memory, such as volatile Random Access Memory (RAM) including a cache area for the temporary storage of data. The memory 420 may also include non-volatile memory, which can be embedded and/or may be removable. The non-volatile memory can additionally or alternatively include an electrically erasable programmable read-only memory (EEPROM), flash memory or the like.

The memory 420 can store any of a number of applications which comprise computer-executable instructions/code executed by the processor 410 to implement the functions of the computing device system 400 and/or one or more of the process/method steps described herein. For example, the memory 420 may include such applications as a conventional web browser application 422, an audio cryptology execution application 421, entity application 424. These applications also typically instructions to a graphical user interface (GUI) on the display 430 that allows the user 110 to interact with the entity system 200, cryptographic device 500, the audio cryptology execution system 300, and/or other devices or systems. The memory 420 of the computing device system 400 may comprise a Short Message Service (SMS) application 423 configured to send, receive, and store data, information, communications, alerts, and the like via the wireless telephone network 152. In some embodiments, the audio cryptology execution application 421 provided by the audio cryptology execution system 300 allows the user 110 to access the audio cryptology execution system 300. In some embodiments, the entity application 424 provided by the entity system 200 and the audio cryptology execution application 421 allow the user 110 to access the functionalities provided by the audio cryptology execution system 300, the cryptographic device 500, and the entity system 200.

The memory 420 can also store any of a number of pieces of information, and data, used by the computing device system 400 and the applications and devices that make up the computing device system 400 or are in communication with the computing device system 400 to implement the functions of the computing device system 400 and/or the other systems described herein.

FIG. 5 provides a provides a block diagram illustrating a cryptographic device 500 of FIG. 1, in accordance with an embodiment of the invention. As illustrated in FIG. 5, in one embodiment of the invention, the cryptographic device 500 comprises one or more components, where the one or more components include one or more processing devices 220 operatively coupled to a network communication interface 210 and a memory device 230, an audio tone generator and emitter 560, and an audio signal recorder 570. In some embodiments, the system may further comprise one or more input devices, where the one or more input devices may include, but are not limited to, a microphone. In some embodiments, the audio signal recorder 570 may comprise the microphone.

It should be understood that the memory device 530 may include one or more databases or other data structures/repositories. The memory device 530 also includes computer-executable program code that instructs the processing device 520 to operate the network communication interface 510 to perform certain communication functions of the cryptographic device 500 described herein. For example, in one embodiment of the cryptographic device 500, the memory device 530 includes, but is not limited to, a network server application 540, an audio cryptology execution application 550, and a data repository 580. The computer-executable program code of the network server application 540 and the audio cryptology execution application 550 to perform certain logic, data-extraction, and data-storing functions of the cryptographic device 500 described herein, as well as communication functions of the cryptographic device 500.

The network server application 540 and the audio cryptology execution application 550 are configured to store data in the data repository 580 or to use the data stored in the data repository 580 when communicating through the network communication interface 510 with the audio cryptology execution system 300, the entity system 200, and/or the computing device system 400 to perform one or more process steps described herein. In some embodiments, the cryptographic device 500 may receive instructions from the audio cryptology execution system 300 via the audio cryptology execution application 550 to perform one or more operations described below. The audio cryptology execution application 550 may be provided by the audio cryptology execution system 300.

FIG. 6 provides a flowchart 600 illustrating a process flow for executing audio cryptology in real-time for audio misappropriation prevention, in accordance with an embodiment of the invention. As shown in block 610, the system identifies, via a cryptographic device, one or more audio signals. The real-time monitoring application 350 of the system may continuously monitor in real-time, via the cryptographic device 500, to instantly detect the one or more audio signals. The one or more audio signals may be any type of audio signals coming from a user wearing the cryptographic device 500. For example, the system may detect that the user is talking via a microphone present in the cryptographic device and may initiate the process flow. In some embodiments, the system may transmit one or more instructions to cause the cryptographic device to record the one or more audio signals.

As shown in block 620, the system causes the cryptographic device to generate and emit a dynamically varying continuous audio tone. In response to identifying the one or more audio signals, the system may instantly transmit one or more instructions in real-time to the cryptographic device 500 to generate and emit the dynamically varying continuous audio tone. In some embodiments, the system may cause the cryptographic device to generate and emit the dynamically varying continuous audio tone upon detection of one or more devices around the user wearing the cryptographic device. Upon receiving the instructions from the system, the cryptographic device generates and emits the dynamically varying continuous audio tone via the audio tone generator and emitter 560. The dynamically varying continuous audio tone generated by the cryptographic device is a tone that is inaudible to users and audible to any recording devices, where the recording devices may include, but are not limited to, desktop computers, mobile phones, and any other devices that comprise a microphone for capturing audio signals. In some embodiments, the dynamically varying continuous audio tone mixes with the one or more audio signals and causes recording of the one or more audio signals to have varying characteristics, thereby preventing misappropriation of the one or more audio signals. For example, if the recording devices recorded a speech of the user wearing the cryptographic device emitting the dynamically varying continuous audio tone, the dynamically varying continuous audio tone embedded in the recording along with the speech of the user may cause the user's speech to be distorted, to have a different accent, to sound robotic, and/or the like. The process of generating and transmitting one or more instructions to the cryptographic device to cause the cryptographic device to generate and emit the dynamically varying continuous audio tone is discussed in detail in FIG. 7.

As shown in block 630, the system continuously monitors in real-time the one or more audio signals, via the cryptographic device. After causing the cryptographic device 500 to generate and emit the dynamically varying continuous audio tone, the system continues minoring the one or more audio signals via the real-time monitoring application 350.

As shown in block 640, the system determines, via the cryptographic device, termination of the one or more audio signals based on continuously monitoring the one or more audio signals in real-time. Based on continuously monitoring the one or more audio signals in real-time, the system determines that the one or more audio signals have been terminated. Continuing with the previous example, the system may determine that the user has stopped delivering the speech.

As shown in block 650, the system causes the cryptographic device to stop emitting the dynamically varying continuous audio tone. In response to determining that the one or more audio signals have been terminated, the system transmits one or more instructions to the cryptographic device to stop generating and emitting the dynamically varying continuous audio tone.

FIG. 7 provides a process flow for causing the cryptographic device 500 to generate and emit a dynamically varying continuous audio tone, in accordance with an embodiment of the invention. As shown in block 710, the system selects a frequency for generating the dynamically varying continuous audio tone. The system may randomly select a frequency from a list of frequencies for generating the dynamically varying continuous audio tone. After selecting the frequency, the system may transmit the frequency to the cryptographic device and cause the cryptographic device to generate and emit the dynamically varying continuous audio tone using the frequency as shown in block 720. As shown in block 730, the system stores the frequency and a time stamp associated with generation of the dynamically varying continuous audio tone by the cryptographic device using the frequency.

As shown in block 740, the system determines that the time stamp meets a predefined limit. The system may determine that the time elapsed after the cryptographic device started emitting and generating the dynamically varying continuous audio tone meets the predefined limit. As shown in block 750, in response to determining that the predefined limit has been met, the system selects a new frequency for generating the dynamically varying continuous audio tone. The system may randomly select the new frequency from a list of frequencies for generating the dynamically varying continuous audio tone, where the new frequency is different from the frequency selected in block 710. The system may randomly select the frequencies such that a frequency does not repeat at regular intervals and that difference between no two frequencies is the same. In some embodiments, the predefined limit may also be dynamically changed by the system. Varying the frequency of the audio tone generated by the cryptographic device, prevents unauthorized users from using parts of the one or more audio signals for misappropriation. As shown in block 760, the system causes the cryptographic device to generate and emit the dynamically varying continuous audio tone using the new frequency. After selecting the new frequency, the system transmits the new frequency to the cryptographic device and the instructions that cause the cryptographic device to generate and emit the dynamically varying continuous audio tone using the new frequency.

As shown in block 770, the system stores the new frequency and a new time stamp associated with generation of the dynamically varying continuous audio tone by the cryptographic device using the new frequency. Storing the dynamically varying frequencies at dynamically varying intervals and the time stamps associated with generating and emitting the dynamically varying continuous audio tone using the dynamically varying frequencies allows the system to track and link the time stamps and the dynamically varying frequencies to the one or more audio signals. In one example, where a misappropriated recording is identified or received by the system, the system may isolate the dynamically varying continuous audio tone embedded in the misappropriated recording and may identify the frequency associated with the dynamically varying continuous audio tone and at what time the unauthorized user may have recorded the audio based on the identified frequency. In some embodiments, the system may also identify a recording device associated with recording of audio used in the misappropriated recording based on the identified frequency and time. In such embodiments, the system may also communicate with one or more entity systems or any other systems to identify the recording device. For example, the system may identify that only a first recording device was connected to a nearby beacon or a limited wireless network at the identified time associated with the misappropriated recording and may identify the first recording device as the recording device associated with recording of audio used in the misappropriated recording. In response to identified the recording device, the system may take one or more actions to prevent any future misappropriated recordings, where the one or more actions may comprise identifying a user of the recording device, blocking the recording device and/or the user, or the like.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for executing audio cryptology in real-time for audio misappropriation prevention, the system comprising:
   at least one network communication interface;
   at least one non-transitory storage device; and
   at least one processing device coupled to the at least one non-transitory storage device and the at least one network communication interface, wherein the at least one processing device is configured to:
   identify, via a cryptographic device, one or more audio signals;
   in response to determining the one or more audio signals, cause the cryptographic device to generate and emit a dynamically varying continuous audio tone;
   continuously monitor in real-time the one or more audio signals, via the cryptographic device;
   determine, via the cryptographic device, termination of the one or more audio signals based on continuously monitoring the one or more audio signals in real-time; and
   cause the cryptographic device to stop generating and emitting the dynamically varying continuous audio tone.

2. The system of claim 1, wherein the at least one processing device is configured to:
   cause the cryptographic device to record the one or more audio signals.

3. The system of claim 1, wherein the at least one processing device is configured to cause the cryptographic device to emit the dynamically varying continuous audio tone based on:
   selecting a frequency for generating the dynamically varying continuous audio tone; and
   storing the frequency and a time stamp associated with generation of the dynamically varying continuous audio tone by the cryptographic device using the frequency.

4. The system of claim 3, wherein the at least one processing device is configured to:
   determine that the time stamp meets a predefined limit;
   select a new frequency for generating the dynamically varying continuous audio tone; and
   cause the cryptographic device to generate and emit the dynamically varying continuous audio tone using the new frequency.

5. The system of claim 4, wherein the at least one processing device is configured to store the new frequency and a new time stamp associated with generation of the dynamically varying continuous audio tone by the cryptographic device using the new frequency.

6. The system of claim 1, wherein the dynamically varying continuous audio tone is a tone that is inaudible to one or more users and audible to one or more recording devices.

7. The system of claim 1, wherein the dynamically varying continuous audio tone mixes with the one or more audio signals and causes recording of the one or more audio signals to have varying characteristics.

8. A computer program product for executing audio cryptology in real-time for audio misappropriation prevention, the computer program product comprising a non-transitory computer-readable storage medium having computer executable instructions for causing a computer processor to perform the steps of:
   identifying, via a cryptographic device, one or more audio signals;
   in response to determining the one or more audio signals, causing the cryptographic device to generate and emit a dynamically varying continuous audio tone;
   continuously monitoring in real-time the one or more audio signals, via the cryptographic device;
   determining, via the cryptographic device, termination of the one or more audio signals based on continuously monitoring the one or more audio signals in real-time; and
   causing the cryptographic device to stop generating and emitting the dynamically varying continuous audio tone.

9. The computer program product of claim 8, wherein the computer executable instructions cause the computer processor to perform the steps of causing the cryptographic device to record the one or more audio signals.

10. The computer program product of claim 8, wherein the computer executable instructions cause the computer processor to perform the step of causing the cryptographic device to emit the dynamically varying continuous audio tone based on:
    selecting a frequency for generating the dynamically varying continuous audio tone; and
    storing the frequency and a time stamp associated with generation of the dynamically varying continuous audio tone by the cryptographic device using the frequency.

11. The computer program product of claim 10, wherein the computer executable instructions cause the computer processor to perform the steps of:
    determining that the time stamp meets a predefined limit;
    selecting a new frequency for generating the dynamically varying continuous audio tone; and causing the cryptographic device to generate and emit the dynamically varying continuous audio tone using the new frequency.

12. The computer program product of claim 11, wherein the computer executable instructions cause the computer processor to perform the step of storing the new frequency and a new time stamp associated with generation of the dynamically varying continuous audio tone by the cryptographic device using the new frequency.

13. The computer program product of claim 8, wherein the dynamically varying continuous audio tone is a tone that is inaudible to one or more users and audible to one or more recording devices.

14. The computer program product of claim 8, wherein the dynamically varying continuous audio tone mixes with the one or more audio signals and causes recording of the one or more audio signals to have varying characteristics.

15. A computer implemented method for executing audio cryptology in real-time for audio misappropriation prevention, wherein the method comprises:
   identifying, via a cryptographic device, one or more audio signals;
   in response to determining the one or more audio signals, causing the cryptographic device to generate and emit a dynamically varying continuous audio tone;
   continuously monitoring in real-time the one or more audio signals, via the cryptographic device;
   determining, via the cryptographic device, termination of the one or more audio signals based on continuously monitoring the one or more audio signals in real-time; and
   causing the cryptographic device to stop generating and emitting the dynamically varying continuous audio tone.

16. The computer implemented method of claim 15, wherein the method further comprises causing the cryptographic device to record the one or more audio signals.

17. The computer implemented method of claim 15, wherein causing the cryptographic device to emit the dynamically varying continuous audio tone based on:
   selecting a frequency for generating the dynamically varying continuous audio tone; and
   storing the frequency and a time stamp associated with generation of the dynamically varying continuous audio tone by the cryptographic device using the frequency.

18. The computer implemented method of claim 17, wherein the method comprises:
   determining that the time stamp meets a predefined limit;
   selecting a new frequency for generating the dynamically varying continuous audio tone; and
   causing the cryptographic device to generate and emit the dynamically varying continuous audio tone using the new frequency.

19. The computer implemented method of claim 18, wherein the method further comprises storing the new frequency and a new time stamp associated with generation of the dynamically varying continuous audio tone by the cryptographic device using the new frequency.

20. The computer implemented method of claim 15, wherein the dynamically varying continuous audio tone is a tone that is inaudible to one or more users and audible to one or more recording devices.

* * * * *